2,918,474

CERTAIN MALEIMIDO DERIVATIVES OF ALIPHATIC-BIS-IMIDAZOLINES

William B. Hughes, Webster Groves, Mo., assignor to Cities Service Research and Development Company, New York, N.Y., a corporation of New Jersey No Drawing. Application June 11, 1956
Serial No. 590,399

9 Claims. (Cl. 260—309.6)

This invention relates to inhibiting corrosion of metals, and is more particularly directed to improved compositions and processes for minimizing the corrosive effect of oil brine mixtures on oil field production and transmission equipment.

It is generally recognized that oil-producing formations often yield with the crude oil a brine which is extremely corrosive in its action upon the oil-producing and collecting equipment, including the metal tubings, casings, pumps, pipe lines, tanks, ships, and other storage and transfer equipment. This type of corrosion is particularly noticeable in wells producing brine which contain varying amounts of hydrogen sulfide, carbon dioxide, and other acidic materials.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide new and improved corrosion inhibiting compounds having properties and characteristics which make them uniquely effective in minimizing and reducing corrosion of metals.

It is another object of this invention to provide new corrosion inhibitors which are particularly effective in preventing corrosion in wells producing oil brine and in reducing corrosion in wells in which large amounts of brine are produced as compared to oil.

I have discovered that if a dibasic acid is reacted with a polyamine in the molar ratio of 1:2, i.e. 1 mol of the dibasic acid to 2 mols of the amine, with 4 mols of water being removed from the reaction mixture, an intermediate bis-imidazoline compound is obtained, which can thereafter be reacted with maleic anhydride to provide new bis-imidazoline-pyrroline dione compounds. If the intermediate bis-imidazoline and maleic anhydride are reacted in equimolar amounts, a bis-imidazoline-monopyrrolinedione will be obtained, whereas if the bis-imidazoline and maleic anhydride are reacted in a molar ratio of 1:2, a bis-imidazoline-dipyrrolinedione will be obtained.

The new compounds of my invention which possess unexpectedly effective corrosion inhibiting properties may generally be represented as follows:

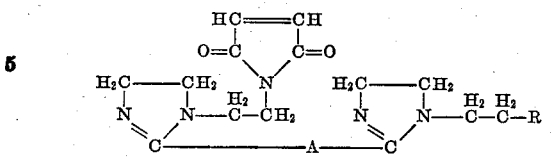

wherein A is the residue of a dibasic acid having from 1 to about 30 carbon atoms, and R is a member of the group consisting of NH₂ and

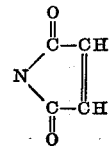

The intermediate bis-imidazoline compounds used in preparing the new imidazoline-pyrrolinedione compounds of my invention are prepared by reacting 2 mols of a polyamine with 1 mol of the dibasic acid in the presence of an azetrope-forming solvent. The solvent, which can be any suitable azeotrope-forming solvent such as benzene, xylene, toluene, or the like, is utilized to remove water from the reaction mixture so that imidazoline ring formation can be effected. The production of the bis-imidazoline is accomplished in a decanter type column provided with a water trap. Refluxing the reactants in the presence of the azeotrope-forming solvent generally for a period of from about 1 to about 6 hours at the reflux temperature for the particular solvent used, normally from about 80° C. to about 150° C. with the above mentioned solvents, will bring about formation of the bis-imidazoline compound. It is, of course, understood that after the theoretical amount of water has been recovered from the reaction mixture, in the present case it would be 4 mols of water with the amounts of the reactants recited above, thus indicating ring closure, the azeotrope-forming solvent is removed from the reaction mixture by distillation, and the reaction mixture raised to a temperature of about 250–290° C. to insure complete ring formation.

In preparing these intermediate bis-imidazoline compounds, I have found that the ethylene polyamines are to be preferred. Particularly satisfactory are the polyethyleneamines such as diethylene triamine, triethylene tetramine, tetraethylene pentamine, and similar compounds.

With respect to the dibasic acid utilized in preparing the bis-imidazoline compounds, a number of such acids can be satisfactorily used. Generally speaking, a dibasic acid having from 1 to about 30 carbon atoms can be used. The acid selected can be a straight chain or branched chain, saturated or unsaturated, aliphatic, alicyclic or aromatic, and may include such substituents as hydroxyl or other groups.

Dimerized acids are very suitable for the purposes of this invention, in particular dimers of sorbic, palmitolic, linoleic, humoceric, and eicosinic acids. Among the more common dibasic acids which are particularly suitable are the following: malonic, methylmalonic, succinic, methylsuccinic, dimethylsuccinic, glutaric, adipic, pimelic, suberic, azelaic, sebacic, maleic, citraconic, mesaconic, itaconic, glutaconic, muconic, tartronic, malic, trihydroxy glutaric, dihydroxytartaric, phthalic, and terephthalic acids.

In preparing the bis-imidazoline-pyrrolinedione compounds utilizing the intermediate imidazoline compounds described above, 1 or 2 mols of maleic anhydride are used. The intermediate imidazoline compound is reacted with maleic anhydride under conditions which effect the formation of the pyrrolinedione ring on the side chain of the bis-imidazoline compound. Formation of the pyrrolinedione ring occurs at the primary amine group on the bis-imidazoline compound side chain. Pyrrolinedione ring formation is accomplished by removing water from the reaction zone as an azeotrope in the manner previously described. If 1 mol of the anhydride is used, a bis-imidazoline-monopyrrolinedione is obtained, whereas if a second mol of the anhydride is used, a bis-imidazoline-dipyrrolinedione is obtained.

These final reaction products, namely bis-imidazoline-mono or dipyrrolinedione compounds, have been found to possess unexpectedly effective corrosion inhibiting properties. Applied to metal surfaces, as described hereafter, these new compounds demonstrate unique and most desirable metal surface protection against various corrosive mediums including oil and gas well brines, as well as other mediums including those of an acidic nature which may include such components as hydrogen sulfide, carbon dioxide and the like.

In order to more fully understand this invention, and particularly the manner in which the bis-imidazoline-pyrrolinedione compounds thereof are obtained and their effectiveness in inhibiting corrosion, the following specific examples are provided:

EXAMPLE 1

To 600 grams (1.0 mol) of dimerized linoleic acid, 206 grams (2.0 mols) of diethylene triamine were added. The mixture was charged to a reflux condenser equipped with a water trap. 50 ml. of xylene were then added to the reaction mixture, and the temperature of the mixture raised to reflux temperature, about 140–145° C. Water removed from the reaction zone as an azeotrope was collected, with the xylene solvent being continuously returned to the reaction zone after separation from the water. After approximately 5 hours of refluxing, 71 grams of water had been removed from the reaction mixture. This represents substantially the theoretical amount of water expected from the formation of the bis-imidazoline compound, based on the molar quantities of reactants used. The xylene solvent was then removed from the reaction mixture, and the temperature of the reaction mass raised to about 280° C. to 290° C. for about 1 hour to insure completion of reaction. The intermediate bis-imidazoline product was then cooled. A molecular weight determination was carried out according to the method of Rast (Ber. 55, 1051, 3727, 1922), and provided a value of 726 for the bis-imidazoline compound. This is to be compared with a theoretical molecular weight value for this reaction product of 734.

EXAMPLE 2

72.6 grams of the intermediate product obtained according to the method described in Example 1 above were dissolved in approximately 100 ml. of xylene, and to this solution, 9.8 grams of powdered maleic anhydride were carefully added with stirring. When the spontaneous reaction had subsided, the mixture was charged to a reflux condenser provided with a water trap. The mixture was heated at reflux (140–150° C.) for approximately 4 hours, with water being continuously recovered in the water trap and the xylene solvent being returned to the reaction mixture. After approximately 1.8 grams of water had been removed from the reaction zone, representing the 1 mol of water theoretically available by the formation of a pyrrolinedione on one of the amine side chains of the intermediate bis-imidazoline compound, xylene was removed from the reaction zone by distillation. The reaction product remaining had a black color and a molecular weight according to the method of Rast of 825. This is to be contrasted with a theoretical molecular weight of 833 for the bis-imidazoline-monopyrrolinedione compound obtainable by reacting 1 mol of the maleic anhydride with 1 mol of the intermediate bis-imidazoline compound of Example 1.

EXAMPLE 3

82.5 (0.1 mol) grams of the bis-imidazoline-monopyrrolinedione compound described in Example 2 above were reacted with a second mol (9.8 grams) of maleic anhydride under the conditions described in Example 2 to cause the formation of a second pyrrolinedione ring on the free primary amine group on the side chain of the bis-imidazoline-monopyrrolinedione compound. The mixture was refluxed in a similar manner, with water being removed as an azeotrope. After the recovery of approximately 1.8 grams of water, the xylene solvent was removed from the reaction mixture by distillation, and the temperature of the reaction mixture raised to slightly above 250° C. to insure completion of the pyrrolinedione ring formation. The final product had a molecular weight of 920, as compared to a theroetical molecular weight value for this final reaction product of 931.

Tested as corrosion inhibitors, the bis-imidazoline-monopyrrolinedione of Example 2 and the bis-imidazoline dipyrrolinedione obtained according to Example 3 above provided the percent protection indicated for inhibitors numbers 1 and 7 respectively in the table which follows.

EXAMPLE 4

In a manner simlar to that described in Example 1 above, 166 grams (1.0) mol) of terephthalic acid were reacted with 206 grams (2.0 mols) of diethylene triamine. The mixture was charged to a condenser equipped with a water trap along with 50 ml. of xylene. The temperature of the reaction mixture was raised to reflux, about 140–145° C., and maintained at this temperature for about 5 hours. Water was continuously removed from the reaction zone as a xylene azeotrope and collected in a trap, with the xylene solvent being continuously returned to the reaction mixture. After approximately 70 grams of water had been removed from the reaction zone, the xylene solvent was distilled and the temperature of the reaction product raised to about 260° C. to insure formation of the imidazoline ring. The final product had a lemon yellow color, and its molecular weight was determined to be 334. This corresponds to a theoretical molecular weight value for this reaction product of 336.

EXAMPLE 5

Utilizing 33.6 grams of the product obtained according to Example 4 above, and following the method described in Example 2, 100 ml. of xylene were added along with 9.8 grams of powdered maleic anhydride. The maleic anhydride was added slowly with care and stirring. When the spontaneous reaction had subsided, the mixture was placed under reflux and heated for approximately 4 hours. After approximately 1.8 grams of water had been removed as a xylene azeotrope, the xylene solvent was distilled from the reaction zone, leaving a yellow viscous liquid which was determined to have a molecular weight of 415. The theoretical molecular weight value for this compound, a bis-imidazoline-monopyrrolinedione, is 416. This compound is identified as inhibitor number 2 in the table which follows.

EXAMPLE 6

In a manner similar to that described in Example 3, 0.1 mol of the product obtained according to Example 5 above was further reacted with another 0.1 mol of the maleic anhydride to provide a final reaction product, after recovery of water and removal of the azeotrope-forming solvent, having a molecular weight of 513. The theoretical molecular weight for this yellow, glass-like solid compound is 508. This product is identified as inhibitor number 8 in the table which follows.

EXAMPLE 7

An intermediate bis-imidazoline compound was prepared according to the method described in Example 1 by reacting 118 grams (1.0 mol) of succinic acid with 206 grams (2.0 mols) of diethylene triamine in the presence of 50 ml. of xylene. The reaction was carried out under conditions similar to those described in Example 1, with a dark colored product being obtained having a molecular weight of 286. The theoretical molecular weight for this compound is 288.

EXAMPLE 8

0.1 mol (28 grams) of the intermediate bis-imidazoline product obtained according to Example 7 above was reacted with 9.8 grams of maleic anhydride in the presence of about 100 ml. of xylene under conditions and according to the method set forth in Example 2. After recovery of 1 mol of water and distillation of the xylene solvent, a final reaction product was obtained having a molecular weight of 370. The theoretical molecular weight value for this bis-imidazoline-monopyrrolinedione compound is 368. This compound is identified as inhibitor number 3 in the following table.

EXAMPLE 9

Following the method described in Example 3, 36.8 grams (0.1 mol) of the product of Example 8 above were reacted with an additional 0.1 mol (9.8 grams) of maleic anhydride under conditions similar to those described in Examples 3 and 6 above. The final reaction product, after removal of water, formation of the pyrrolinedione ring, and distillation of xylene solvent, was determined to have a molecular weight of 445. This compares to a theoretical molecular weight value for this compound of 450. The compound was tested as a corrosion inhibitor, and is identified as inhibitor number 9 in the table which follows:

The effectiveness of the bis-imidazoline-pyrrolinedione compounds obtained according to the method set forth in the foregoing examples as corrosion inhibitors will be evident from the table which follows, wherein results of the protection afforded by these compounds in inhibiting corrosion are recorded.

The test adopted in comparing the effectiveness of the various compounds of this invention utilizes prepared brines which substantially duplicate corrosion conditions met in oil field operations. While the tests were conducted primarily on these prepared brines, it is, of course, understood that the compounds of my invention may be utilized under a wide variety of corrosion conditions. This test is generally referred to as a static test, since no movement of test strips is made after the test strip has been immersed in the brine. This is to be contrasted with the dynamic test described in my copending application, Serial Number 552,264, filed December 12, 1955, wherein the test strip is continuously dipped in the corrosive brine over a fixed period of time.

The test procedure used herein involved a measurement of the corrosive action of a hypothetical well fluid as inhibited with compositions described above upon weighed, cleaned, and polished strips of number 18 gauge, cold rolled steel measuring one-quarter inch by four inches, under conditions closely approximating those existing in a producing well and a comparison thereof with the results obtained by subjecting identical strips to the corrosive action of the hypothetical well fluid without inhibitor added.

The test includes the use of a number of bottles or flasks sufficient to provide one for the testing of corrosion inhibitors in varying amounts, and one for comparison for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about 1 hour to purge any oxygen present. After the purging was completed, the corrosion inhibitor being tested was added to each flask in amounts ranging from 10 to 25 p.p.m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times, precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus a protection percent may be calculated for each of the test strips taken from the inhibited test fluids in accordance with the following formula:

$$\frac{L1 - L2}{L1} \times 100 = \text{percent protection}$$

in which L1 is the loss in weight of strips taken from uninhibited test fluids, and L2 is the loss in weight of strips which were subjected to inhibited test fluids.

Following the procedure outlined above, the compounds prepared according to Examples 2, 3, 5, 6, 8 and 9 were tested as corrosion inhibitors. Results of these tests, as well as the tests of similar compounds prepared according to identical methods as indicated by the mol ratios appearing in the table are recorded hereafter. These results clearly demonstrate the effectiveness of the bis-imidazoline-pyrrolinedione of this invention in providing protection against the undesirable reaction of corrosive brines

*Table*

| Inhibitor No. | Formulation | Percent Protection | |
|---|---|---|---|
| | | 25 p.p.m. | 10 p.p.m. |
| 1 | DETA—Dimer—Maleic 2:1:1 | 86.9 | 53.2 |
| 2 | DETA—Terephthalic—Maleic 2:1:1 | 92.1 | 78.6 |
| 3 | DETA—Succinic—Maleic 2:1:1 | 86.9 | 59.7 |
| 4 | DETA—Sebacic—Maleic 2:1:1 | 97.3 | 92.1 |
| 5 | DETA—Mucic—Maleic 2:1:1 | 96.4 | 90.3 |
| 6 | DETA—Dimer acid—Maleic 2:1 | 76.1 | |
| 7 | DETA—Dimer—Maleic 2:1:2 | 84.1 | 49.4 |
| 8 | DETA—Terephthalic—Maleic 2:1:2 | 99.0 | 62.4 |
| 9 | DETA—Succinic—Maleic 2:1:2 | 96.7 | 67.2 |
| 10 | DETA—Sebacic—Maleic 2:1:2 | 90.3 | 87.8 |
| 11 | DETA—Mucic—Maleic 2:1:2 | 91.0 | 86.4 |

In using the bis-imidazoline-pyrrolinedione compounds of my invention in protecting metal surfaces including piping, casing, storage equipment and other metal surfaces which come in contact with corrosive fluids, I have found that excellent results are obtained by injecting an appropriate quantity of the selected compound, generally not more than 1500 to 2000 p.p.m. of the inhibiting compound, and inject the same into the producing well so that it can mingle with the oil brine mixture and come in contact with the producing equipment. If desired, the inhibiting compound may be introduced directly into the top of the casing, either with or without inert carriers such as kerosene, gas oil or other oils of similar composition, and be permitted to flow down into the well and then back through the tubing and into related apparatus. I have found that if this procedure is followed, substantial reduction in corrosion throughout the entire producing and collecting system may be obtained.

The nature of the improved compositions of my invention is not fully understood, but apparently the bis-imidazoline-pyrrolinedione structures preferentially wet the surface of the metal, thus excluding corrosive material or fluids from coming in contact with the metal surface. In any event, however, despite the lack of a complete understanding of the mechanics of the protective effect obtained, these new compounds are extremely and surprisingly effective in protecting metallic surfaces from corrosion.

It is to be understood that the improved compounds of my invention are not limited to use alone or singly, and may be applied along with other agents commonly introduced into producing wells for breaking emulsions, preventing scale formation, minimizing pitting, etc. It is further evident that my invention is not restricted to the use of these new compounds in inhibiting oil well corrosion, but may be employed to perform this protective function in the presence of corrosive fluids derived from many other sources.

What I claim is:

1. As a new composition of matter, a compound having the formula

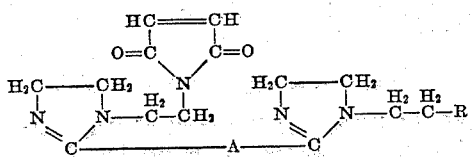

wherein A is a radical selected from the group consisting of hydrocarbon radicals of dimer aliphatic unsaturated acids having from 10 to 34 carbon atoms, alkylene and alkenylene radicals having not more than 8 carbon atoms, the radical of a dibasic hydroxy acid of not more than 4 carbon atoms and phenylene and R is a member of the group consisting of $NH_2$ and

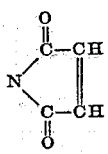

2. As a new composition of matter a compound as claimed in claim 1, wherein A is $C_{34}H_{62}$ and R is $NH_2$.

3. As a new composition of matter a compound as claimed in claim 1, wherein A is $C_{34}H_{62}$ and R is

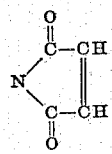

4. As a new composition of matter a compound as claimed in claim 1, wherein A is $C_6H_4$ and R is $NH_2$.

5. As a new composition of matter a compound as claimed in claim 1, wherein A is $C_6H_4$ and R is

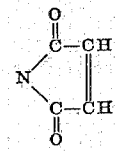

6. As a new composition of matter a compound as claimed in claim 1, wherein A is $(CHOH)_4$ and R is

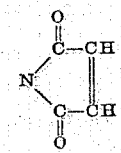

7. As a new composition of matter a compound as claimed in claim 1, wherein A is $C_2H_4$ and R is $NH_2$.

8. As a new composition of matter a compound as claimed in claim 1, wherein A is $C_8H_{16}$ and R is $NH_2$.

9. As a new composition of matter a compound as claimed in claim 1, wherein A is $C_8H_{16}$ and R is

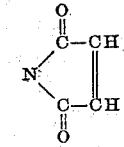

References Cited in the file of this patent

UNITED STATES PATENTS

| | | |
|---|---|---|
| 2,194,419 | Chwala | Mar. 19, 1940 |
| 2,468,163 | Balir et al. | Apr. 26, 1949 |
| 2,643,977 | Hughes | June 30, 1953 |
| 2,647,125 | Gunderson | July 28, 1953 |
| 2,713,583 | Smith | July 19, 1955 |